US012681303B2

(12) United States Patent
Kurachi et al.

(10) Patent No.: US 12,681,303 B2
(45) Date of Patent: Jul. 14, 2026

(54) LINKED DISPLAY SYSTEM AND HEAD-MOUNTED DISPLAY

(71) Applicant: MAXELL, LTD., Kyoto (JP)

(72) Inventors: Megumi Kurachi, Kyoto (JP); Masuo Oku, Kyoto (JP); Hirokazu Ishii, Kyoto (JP); Osamu Kawamae, Kyoto (JP); Yasunobu Hashimoto, Kyoto (JP); Kazuhiko Yoshizawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 19/033,646

(22) Filed: Jan. 22, 2025

(65) Prior Publication Data

US 2025/0164787 A1     May 22, 2025

Related U.S. Application Data

(63) Continuation of application No. 18/389,256, filed on Nov. 14, 2023, now Pat. No. 12,235,444, which is a
(Continued)

(51) Int. Cl.
*G02B 27/01* (2006.01)
*G06F 3/01* (2006.01)
(Continued)

(52) U.S. Cl.
CPC ............. *G02B 27/017* (2013.01); *G06F 3/01* (2013.01); *G06F 3/1446* (2013.01); *G09G 5/12* (2013.01);
(Continued)

(58) Field of Classification Search
CPC . G02B 27/017; G02B 2027/0192; G06F 3/01; G06F 3/1423; G06F 3/1446;
(Continued)

(56) References Cited

U.S. PATENT DOCUMENTS

2006/0212905 A1     9/2006  Matsuda et al.
2015/0317120 A1    11/2015  Kim et al.
(Continued)

FOREIGN PATENT DOCUMENTS

JP          11-243512  A     9/1999
JP        2002-079711  A     3/2002
(Continued)

OTHER PUBLICATIONS

Japanese Office Action received in corresponding Japanese Application No. 2024-094992 dated May 20, 2025.
(Continued)

*Primary Examiner* — Cory A Almeida
(74) *Attorney, Agent, or Firm* — Mattingly & Malur, PC

(57) ABSTRACT

In a linked display system in which wireless communication connection between a first information device and a second information device has been established, when the first information device transmits text data to the second information device in a state of displaying content containing the text data and image data, the second information device displays the text data while the first information device stops displaying the text data and enlarges and displays the image data.

19 Claims, 14 Drawing Sheets

Related U.S. Application Data continuation of application No. 17/623,640, filed as application No. PCT/JP2019/038623 on Sep. 30, 2019, now Pat. No. 11,852,811.

(51) Int. Cl.

| | | |
|---|---|---|
| *G06F 3/14* | (2006.01) | |
| *G09G 5/12* | (2006.01) | |

(52) U.S. Cl.

CPC .... *G02B 2027/0192* (2013.01); *G06F 3/1423* (2013.01); *G09G 2320/0613* (2013.01); *G09G 2340/0464* (2013.01); *G09G 2356/00* (2013.01)

(58) Field of Classification Search

CPC ............. G09G 5/12; G09G 2320/0613; G09G 2340/0464; G09G 2356/00

See application file for complete search history.

(56) References Cited

U.S. PATENT DOCUMENTS

| | | | |
|---|---|---|---|
| 2016/0217108 | A1 | 7/2016 | Parker et al. |
| 2016/0328881 | A1 | 11/2016 | Ozeki |

FOREIGN PATENT DOCUMENTS

| | | | | |
|---|---|---|---|---|
| JP | 2006-262034 | A | | 9/2006 |
| JP | 2011118683 | A | * | 6/2011 |
| JP | 2011-186856 | A | | 9/2011 |
| JP | 2016-212599 | A | | 12/2016 |
| JP | 2018-166005 | A | | 10/2018 |
| JP | 2019-79469 | A | | 5/2019 |
| JP | 2019-082982 | A | | 5/2019 |
| JP | 2019079469 | A | * | 5/2019 |

OTHER PUBLICATIONS

International Search Report of PCT/JP2019/038623 dated Dec. 10, 2019.

* cited by examiner

TRANSITION OF BROWSING SCENES

SCENE1 SCENE2

10

FIG. 7
DISPLAY STATE A
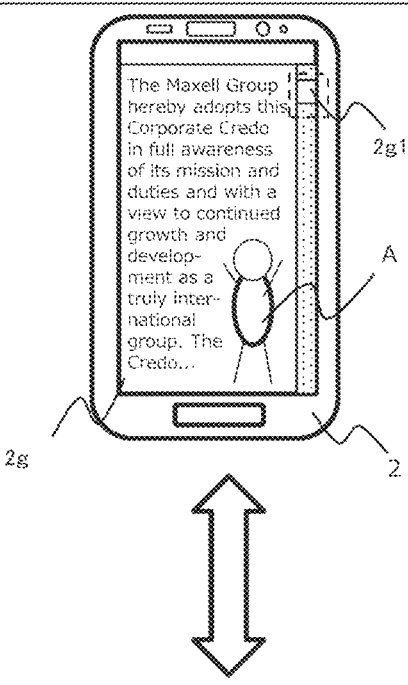
DISPLAY STATE B1
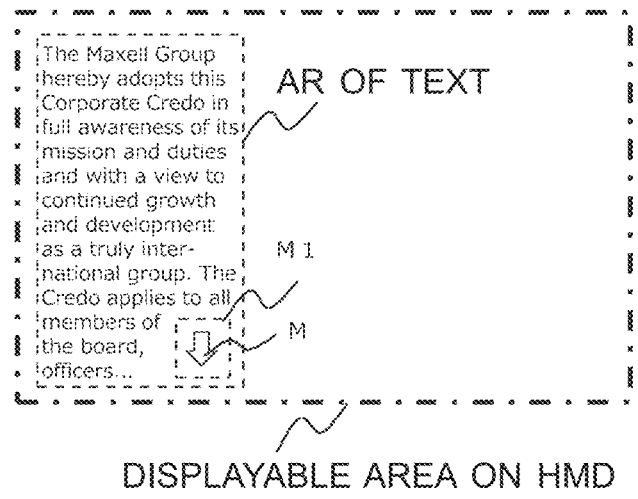
AR OF TEXT
M 1
M
DISPLAYABLE AREA ON HMD
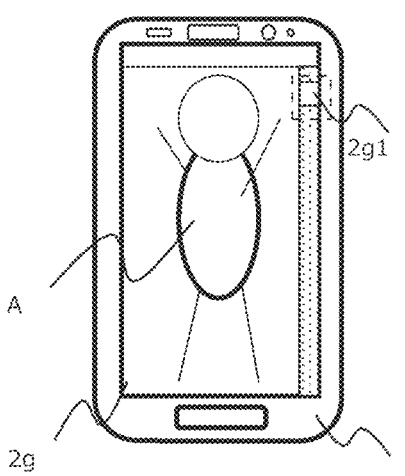

FIG. 10

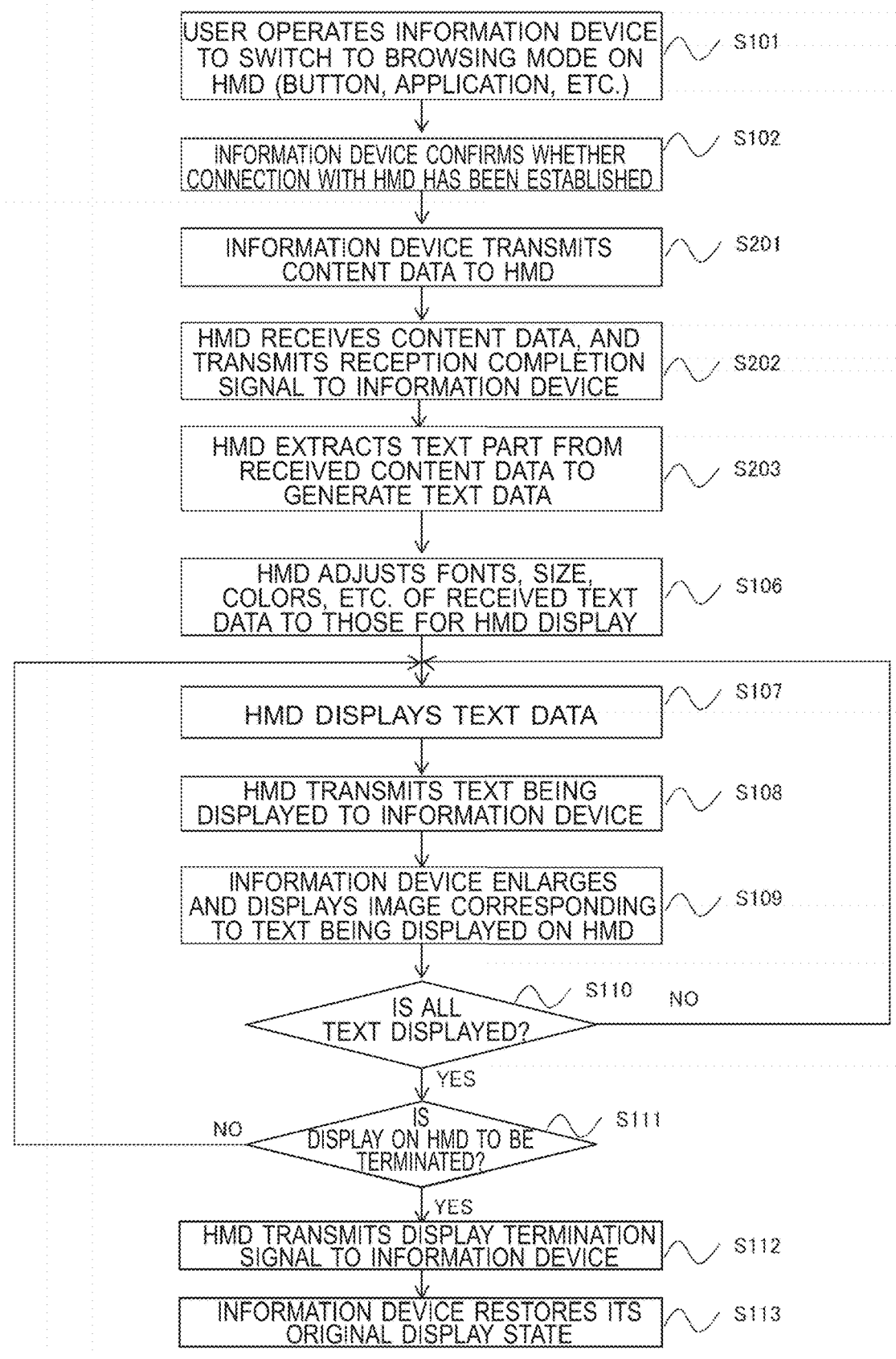

USER OPERATES INFORMATION DEVICE TO SWITCH TO BROWSING MODE ON HMD (BUTTON, APPLICATION, ETC.) — S101

INFORMATION DEVICE CONFIRMS WHETHER CONNECTION WITH HMD HAS BEEN ESTABLISHED — S102

INFORMATION DEVICE TRANSMITS CONTENT DATA TO HMD — S201

HMD RECEIVES CONTENT DATA, AND TRANSMITS RECEPTION COMPLETION SIGNAL TO INFORMATION DEVICE — S202

HMD EXTRACTS TEXT PART FROM RECEIVED CONTENT DATA TO GENERATE TEXT DATA — S203

HMD ADJUSTS FONTS, SIZE, COLORS, ETC. OF RECEIVED TEXT DATA TO THOSE FOR HMD DISPLAY — S106

HMD DISPLAYS TEXT DATA — S107

HMD TRANSMITS TEXT BEING DISPLAYED TO INFORMATION DEVICE — S108

INFORMATION DEVICE ENLARGES AND DISPLAYS IMAGE CORRESPONDING TO TEXT BEING DISPLAYED ON HMD — S109

IS ALL TEXT DISPLAYED? — S110   NO

YES

IS DISPLAY ON HMD TO BE TERMINATED? — S111   NO

YES

HMD TRANSMITS DISPLAY TERMINATION SIGNAL TO INFORMATION DEVICE — S112

INFORMATION DEVICE RESTORES ITS ORIGINAL DISPLAY STATE — S113

AR OF TEXT

M1 step1.
Peel and cut potatoes.

M

DISPLAYABLE AREA ON HMD

FIG. 13

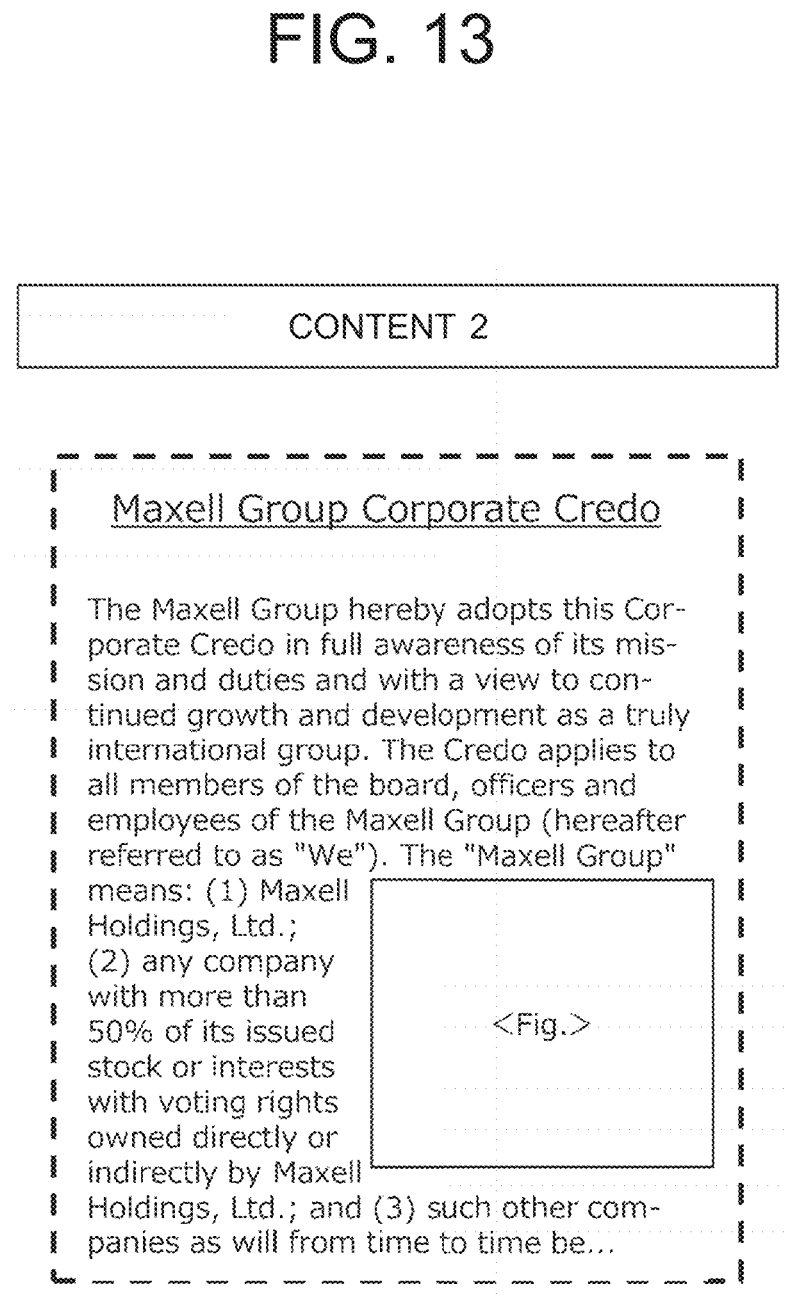

CONTENT 2

Maxell Group Corporate Credo

The Maxell Group hereby adopts this Corporate Credo in full awareness of its mission and duties and with a view to continued growth and development as a truly international group. The Credo applies to all members of the board, officers and employees of the Maxell Group (hereafter referred to as "We"). The "Maxell Group" means: (1) Maxell Holdings, Ltd.; (2) any company with more than 50% of its issued stock or interests with voting rights owned directly or indirectly by Maxell Holdings, Ltd.; and (3) such other companies as will from time to time be...

<Fig.>

AR OF TEXT

M1

The Maxell Group will require all officers and employees to observe and implement this Corporate Credo wherever in the world they work.

M

DISPLAYABLE AREA ON HMD

LINKED DISPLAY SYSTEM AND HEAD-MOUNTED DISPLAY

TECHNICAL FIELD

The present invention relates to a linked display system and a head mount display (HMD).

BACKGROUND ART

The Internet, to which web servers for providing content of a variety of information are connected, enables a user to browse and view the information by using information devices such as personal computers and smartphones. The user browses and views the information through a web browser, which is mounted on an information device as a part of basic operation programs thereof. In general, a user interface of the information device requires manual input, and accordingly, it is difficult for the user to do other tasks while he or she is using the information device to browse web content.

On the other hand, in the case of an HMD which is configured to superimpose images of virtual objects (Argument Reality Object) such as graphics and characters on a real space and display the information thereof to the user, the user wearing the HMD can operate a game device or an installation equipment with a freely movable hand even while playing a game or viewing content such as an operation guide of the installation equipment.

As an example of a display technique for the HMD, Patent Literature 1 discloses a method of linking a mobile terminal serving as an information device with an HMD to display a screen of the mobile device on a screen of the HMD.

CITATION LIST

Patent Literature

Patent Literature 1: JP-A-2011-186856

SUMMARY OF INVENTION

Technical Problem

In general, a display area of the screen of the HMD is smaller than that of the mobile terminal. Accordingly, the screen of the HMD on which the screen of the mobile terminal is simply displayed cannot sufficiently ensure the visibility of the user wearing the HMD. In addition, since the user wearing the HMD mainly views the screen of the HMD, it is not necessary to display the same content on both the mobile terminal and the HMD display. Therefore, there is room for further improvement as to which content to be displayed on the screen of the HMD whose display area is small and how to ensure the visibility.

The present invention has been made in view of the circumstances described above, and thus relates to a technique for efficiently displaying content on an HMD while ensuring visibility.

Solution to Problem

In order to solve the problems described above, the present invention includes the technical features described in the scope of claims. One of the aspects of the present invention is to provide a linked display system in which wireless communication connection between a first information device and a second information device has been established, the first information device comprising: a first display configured to display content containing text data and image data; a first communication unit configured to transmit the text data to the second information device; and a first processor connected to each of the first display and the first communication unit to perform display control and communication control thereof, the second information device comprising: a second communication unit configured to receive the text data from the first information device; a second display configured to display the received text data; and a second processor connected to each of the second display and the second communication unit to perform display control and communication control thereof, wherein in an all-content display state in which the first display is displaying both the text data and the image data, when the first communication unit transmits the text data to the second information device, the first processer causing the first display to stop displaying the text data and display the image data in a display size larger than a display size of the image data in the all-content display state, and the second processor causing the second display to display the received text data.

Advantageous Effects of Invention

According to the present invention, it is possible to efficiently display content on an HMD while ensuring visibility. The objects, configurations, and advantageous effects other than those described above will be clarified by the embodiments below.

BRIEF DESCRIPTION OF DRAWINGS

FIG. 7 illustrates a display switch example by the linked display system.

FIG. 10 illustrates a flowchart of processing of analyzing content on the HMD side.

FIG. 13 illustrates an example of content used in the first embodiment.

DESCRIPTION OF EMBODIMENTS

Hereinafter, embodiments of the present invention will be described with reference to the drawings.

Throughout the drawings, the same components are provided with the same reference signs, and the repetitive explanation therefor are omitted.

First Embodiment

Figure 1:
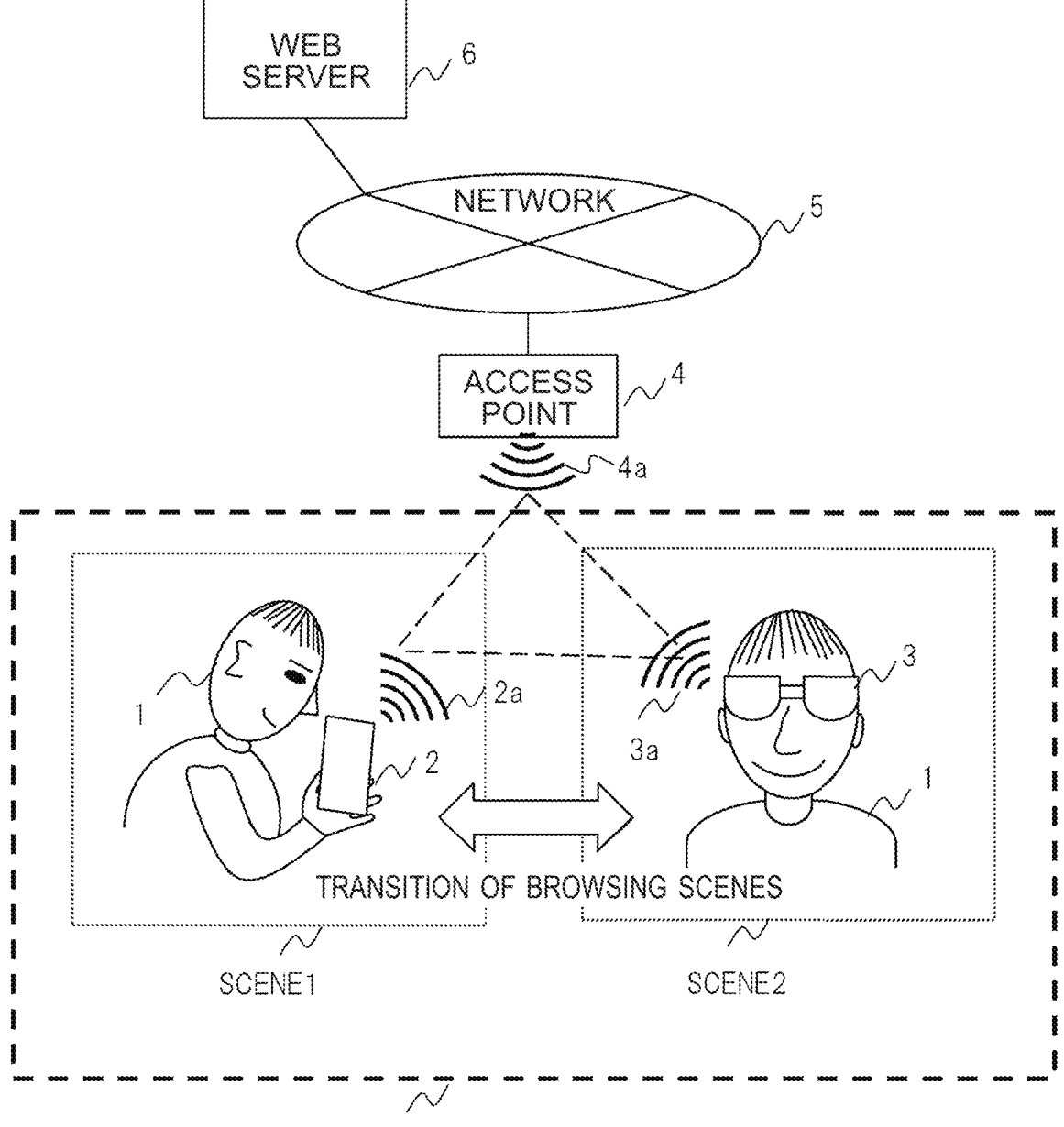
FIG. 1 illustrates a linked display system of an information device and an HMD according to the present embodiment.

FIG. 1 illustrates a configuration of a linked display system for an information device and a head mount display (HMD) according to the present embodiment.

FIG. 1 illustrates a user 1, an information device 2, an HMD 3, an access point 4, communication signals 2a, 3a, 4a, a network 5, and a web server 6.

The user 1 browses or views web content in one of two scenes of SCENE 1 and SCENE 2. The transition between two scenes can be made at an arbitrary timing. In the following, an action in which the user 1 searches and receives the web content by using the information device 2 to watch it on a display screen of the information device 2 is referred to as "browsing", while an action in which the user 1 watches the web content on a virtual screen of the HMD is referred to as "viewing".

In SCENE 1, the user 1 uses the information device 2 to browse the web content. The information device 2 is connected to the network 5 via the communication signals 2a, 4a and the access point 4. The information device 2 is configured to search the web content on the web server 6 connected to the network 5, receive the desired web content, and display it thereon, thereby allowing the user 1 to view the web content.

Preferably, the communication signals 2a, 4a are wireless communication signals for LANs, whereby browsing of the web content can be performed by utilizing TCP/IP and HTTP protocols that are widely used on the Internet.

The network 5 stands for an integration of the Internet and the Intranet. FIG. 1 does not illustrate a proxy server or the like provided between the Internet and the Intranet.

The user 1 searches and invokes the web content, for example, by inputting a keyword or a URL on the information device 2, which restricts a motion of the user's hand. Thus, when the user 1 attempts to do a task requiring a motion of his or her hand while browsing the web content, transition from the SCENE 1 to the SCENE 2 is made. The transition from the SCENE 1 to the SCENE 2 is made, for example, in the case of actually cooking while searching and watching the web content that explains how to cook such as a recipe, and in the case of handling a household appliance while searching an instruction manual thereof on the Internet and watching it.

The user 1 makes connection for wireless communication between the information device 2 (corresponding to the "first information device") and the HMD 3 (corresponding to the "second information device"), temporarily stops displaying the web content, and wears the HMD 3. The SCENE 2 expresses the user 1 who has worn the HMD 3.

The HMD 3 is, for example, an optical see-through type HMD or a video see-through type HMD. In the following, the case employing the optical see-through type HMD 3 will be described.

By using the HMD 3, the user 1 can watch a virtual screen projected by a display optical system at the same time while seeing a real view through an optical screen. The virtual screen displays a part of the web content which was viewed by the user 1 on the information device 2 until immediately before the scene transition. In the present embodiment, the virtual screen displays an image containing only text data.

The HMD 3 is connected to the network 5 via the communication signals 3a, 4a and the access point 4, and is configured to receive the web content from the web server 6. The HMD 3 may be configured to receive the web content via the information device 2.

The communication signals 2a, 3a are signals for connecting the information device 2 to the HMD 3 to establish wireless communication therebetween, which allows them to transmit and receive data with each other. Here, the communication signals 2a, 3a may be wireless LAN signals or Bluetooth (registered mark) signals. The Bluetooth (registered mark) signals implement one-to-one communication between the information device 2 and the HMD 3, and thus enables pairing of the information device 2 and the HMD 3 with a series of protocols. The linked display system 10 is a system capable of display control by connecting the information device 2 to the HMD 3 to establish communication therebetween.

The information device 2 transmits, to the HMD 3, data such as the URL of the web content which was watched by the user 1 until immediately before the scene transition and an elapsed time from the start of watching thereof. The HMD 3 receives the web content corresponding to the received data from the network 5 and causes a display optical system to display it so that the user 1 can watch the web content continuously.

(Information Device)

Figure 2:
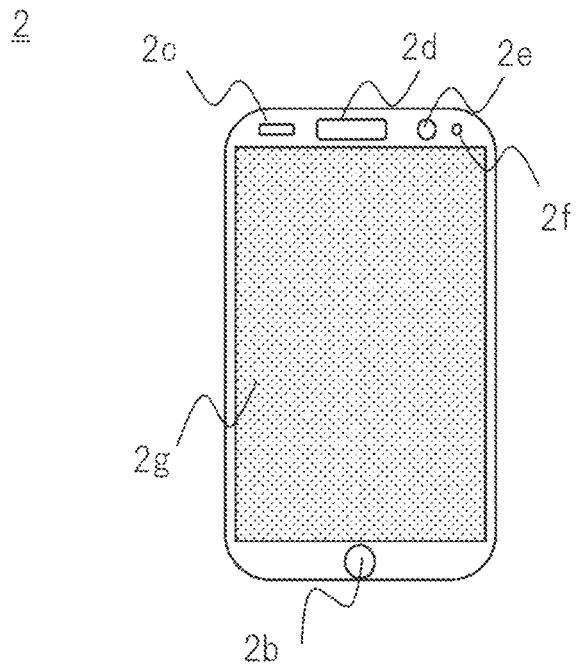
FIG. 2 is a front view of an appearance of the information device.
Figure 3:
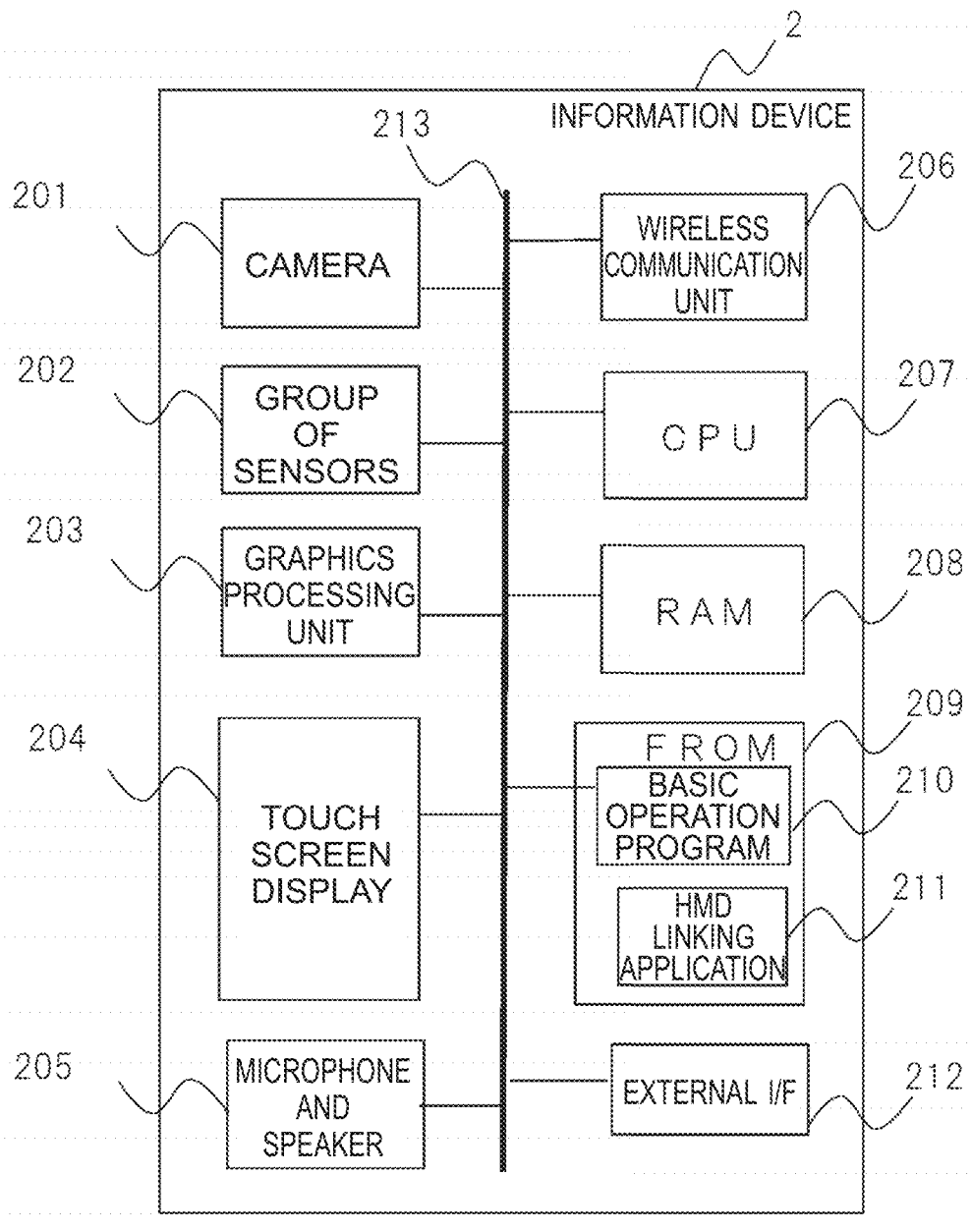
FIG. 3 is a hardware configuration diagram of the information device.

With reference to FIG. 2 and FIG. 3, an example of the information device 2 will be described. FIG. 2 is a front view of an appearance of the information device 2, and FIG. 3 is a hardware configuration diagram of the information device.

FIG. 2 illustrates a home button 2b, an ambient light and proximity sensor 2c, an earpiece 2d, an in-camera 2e, a notification lamp 2f, and a display area 2g (also referred to as the virtual screen) of a touch screen display (corresponding to the "first display"). In addition, although not illustrated in FIG. 2, for example, a volume button and a power button are provided on the side of the information device 2, a speaker, a microphone, a power and/or communication connector, and an earphone jack are provided on the bottom thereof, and an out-camera and a fingerprint sensor are provided on the back surface thereof. These components are not necessarily arranged in the same manner as the example illustrated in FIG. 2.

FIG. 3 illustrates a camera 201 (including at least two cameras, namely, the in-camera and the out-camera), a group of sensors 202 including such as the ambient sensor, the proximity sensor, a GPS sensor, a gyro sensor, a geomagnetic sensor, and an acceleration sensor, a graphics processing unit 203, a touch screen display 204 (the screen 2g in FIG. 2), a microphone and speaker 205, a wireless communication unit (a wireless communication transmitter and receiver) 206 (corresponding to the "first communication unit"), a CPU 207 (corresponding to the "first processor"), a RAM 208, a Flash ROM (FROM) 209, an external interface (I/F) 212, and an internal bus 213.

The FROM 209 includes a basic operation program 210 of the information device 2 and a program of an HMD linking application 211 (installed in the information device), and the CPU 207 loads and executes these programs onto the RAM 208. Furthermore, the FROM 209 can store data generated in the process and as a result of execution of the programs.

The wireless communication unit 206 includes a plurality of communication functions, for example, a mobile communication function such as 4G, a wireless LAN communication function, and a Bluetooth (registered mark) communication function.

The touch screen display 204 is configured to cause a display part to display an image generated by the graphics processing unit 203, and receive an input operation by a user through a touch panel part. The user uses a keyboard screen displayed on the display part and enters such as the URL to browse the web content.

(HMD)

Figure 4:
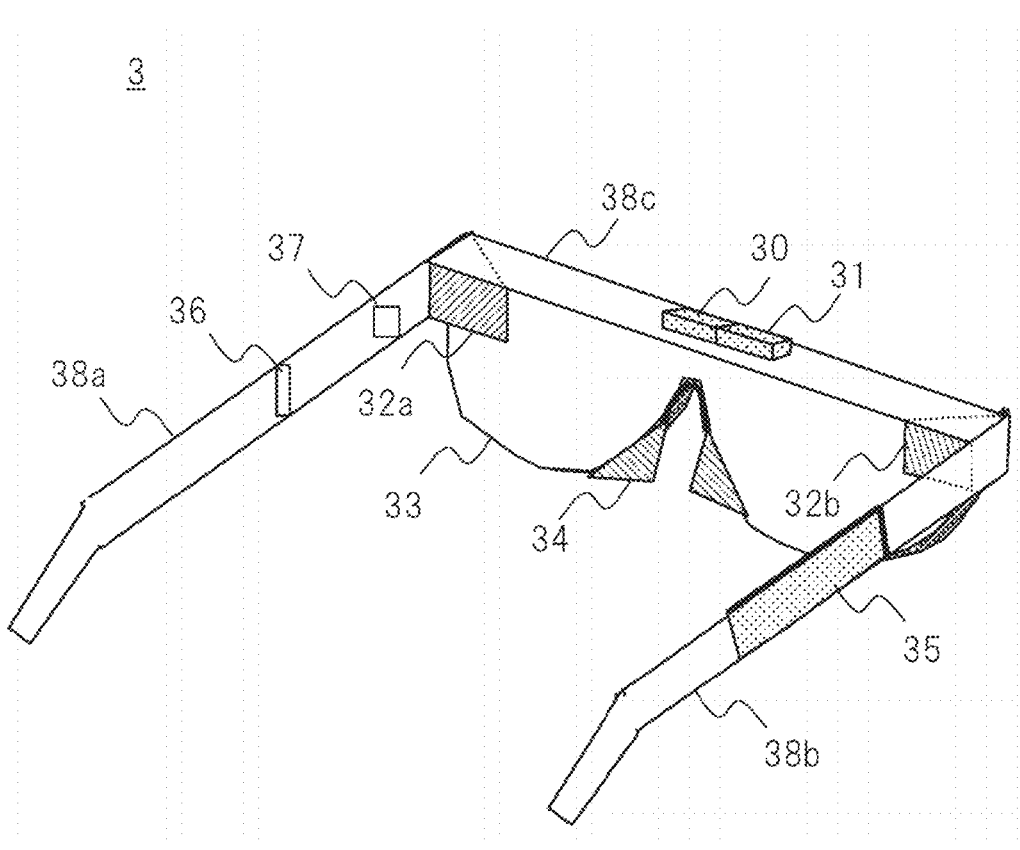
FIG. 4 illustrates an appearance of the HMD.
Figure 5:
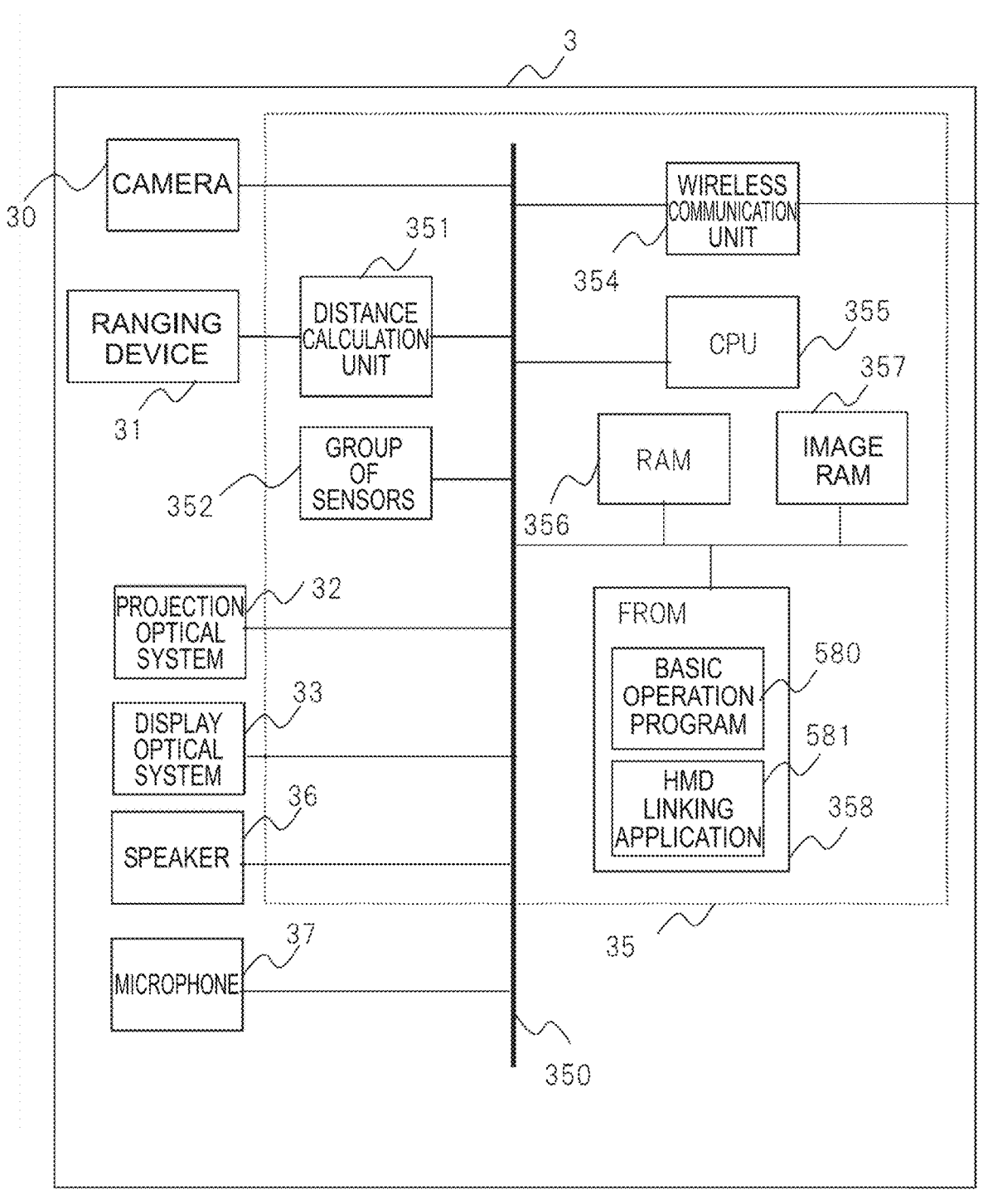
FIG. 5 is a hardware configuration diagram of the HMD.

With reference to FIG. 4 and FIG. 5, an example of the HMD 3 will be described. FIG. 4 illustrates an appearance of the HMD 3, and FIG. 5 is a hardware configuration diagram of the HMD.

FIG. 4 illustrates a camera 30, a ranging device (a ranging sensor) 31, projection optical systems 32a, 32b, a display optical system 33 such as a lens or a screen, a nose pad 34, a processor 35, a speaker 36, a microphone 37, and frame housings 38a, 38b, 38c.

The user 1 wears the HMD 3 on his or her own face by putting the frame housings 38a, 38b and the nose pad 34 thereon.

The camera 30 is mounted on the HMD 3 to capture an image of the front of the user's line of sight. The ranging device 31 is configured to measure a distance to a real object in the real space which is included in the captured image (corresponding to the "front image") of the camera 30.

The ranging device 31 may be the one configured to calculate the distance with respect to feature points such as the outline of the real object in the same method as that of a stereo camera, or may be the one configured to measure the distance by irradiating a light beam two-dimensionally in a method like a TOF (Time of Flight) method, as long as a ranging device to be employed can measure a distance to the real object in the captured image. The ranging device 31 includes the ranging device 31 and a distance calculation unit 351 (see FIG. 5).

The projection optical systems 32a, 32b and the display optical system 33 form a display section (corresponding to the "second display") of the HMD 3. The projection optical systems 32a, 32b are configured to project and display video of the virtual object on the display optical system 33, as an image to be visually recognized by the left eye and an image to be visually recognized by the right eye. Since the user 1 can see a scene and the real object in his or her front through the display optical system 33, the video of the virtual object projected from the projection optical systems 32a, 32b can be displayed at any position on the display optical system 33 as long as the position allows the user 1 to easily distinguish the virtual object from the real object in the real space. Note that the ranging device 31 may not be provided. In this case, the virtual screen is displayed at a position preset in the real space.

The processor 35 (corresponding to the "second processor") is configured to take in the image of the real space captured by the camera 30 and the position data of the real space of the real object acquired by the ranging device 31, and supply an internal memory and the CPU with them. Furthermore, the processor 35 includes the group of sensors such as a gyro sensor, a direction sensor, a position sensor, a contact sensor, and a line-of-sight detection sensor.

The processor 35 is further configured to create an image to be projected by the projection optical systems 32a, 32b and a sound to be output to the speaker 36. The processor 35, the camera 30, the ranging device 31, the speaker 36, and the microphone 37 are arranged on the frame housings 38a, 38b, 38c. These components are not necessarily arranged in the same manner as the example illustrated in FIG. 4.

In FIG. 5, the components which are the same as those in FIG. 4 are provided with the same reference signs. FIG. 5 further illustrates an internal bus 350, the distance calculation unit (a distance calculator) 351, a group of sensors 352, a wireless communication unit (a wireless communication transmitter and receiver) 354, a CPU 355, a RAM 356, an image RAM 357, and a FROM 358.

The projection optical system 32 corresponds to the projection optical systems 32a, 32b in FIG. 4. The projection optical system 32 is configured to cause the display optical system 33 to separately project an image for the left eye and an image for the right eye in the same manner as the projection optical systems 32a, 32b. Alternatively, the projection optical system 32 may be the one configured to project an image for the left eye and an image for the right eye which have been interleaved in one projector, and cause a shutter optical system to transmit the image for the left eye and the image for the right eye through the respective eyes. In addition, the projection optical system 32 may be an optical system using a holographic lens.

The wireless communication unit 354 (corresponding to the "second communication unit") connects the HMD 3 to the network 5 via the access point 4 on the wireless LAN. Furthermore, the wireless communication unit 354 implements one-to-one communication with the information device 2, for example, by Bluetooth (registered trademark) communication.

The FROM 358 includes, as processing programs, a basic operation program 580 and a program 581 of the HMD linking application. The CPU 355 loads and executes these processing programs onto the RAM 356. Furthermore, the FROM 358 can store data generated in the process and as a result of execution of the programs.

The image data to be transmitted to the projection optical system 32 is stored in the image RAM 357 and read out from the image RAM 357.

Figure 6:
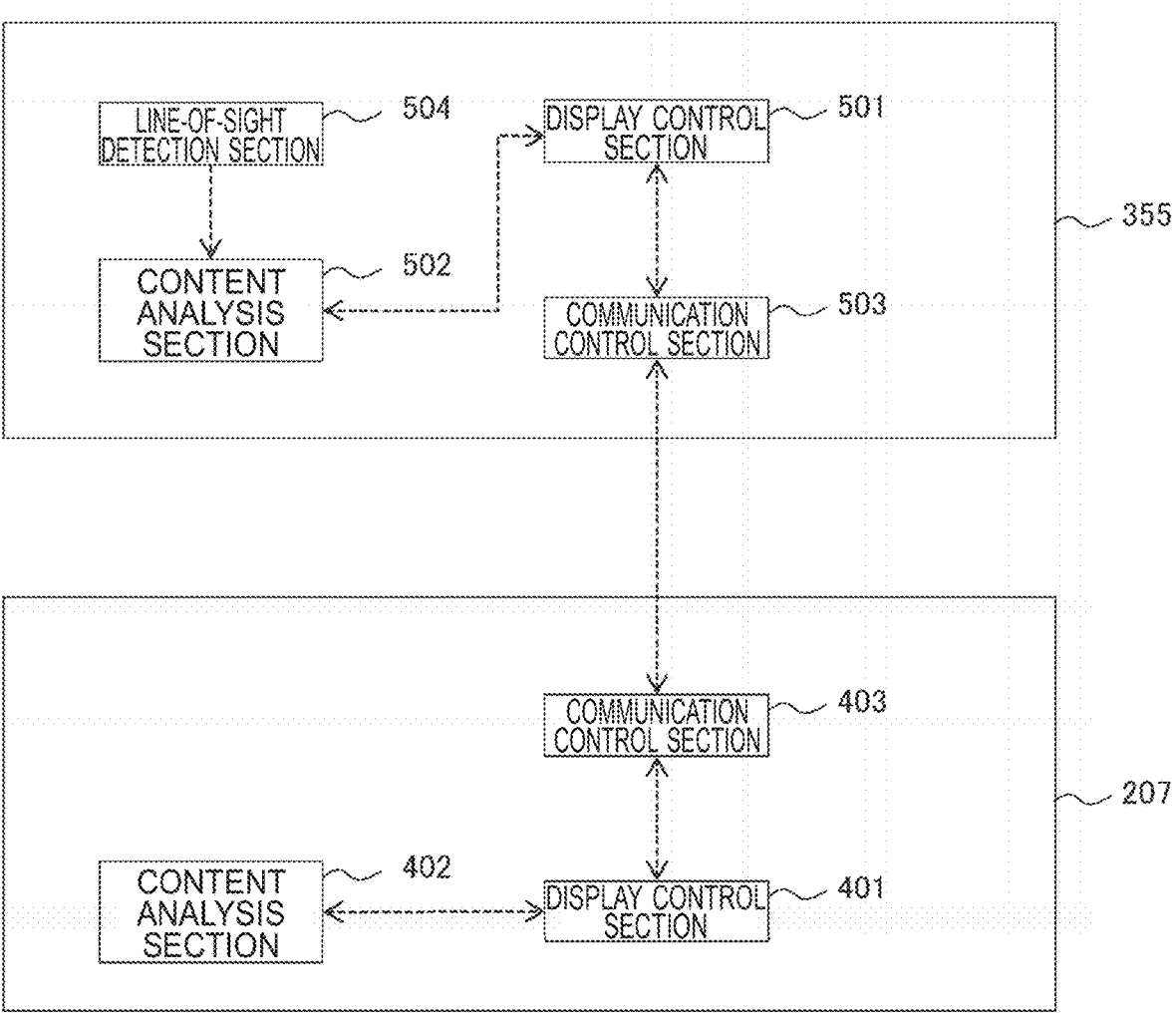
FIG. 6 illustrates a configuration of functions of the linked display system.

FIG. 6 is a block diagram illustrating program functions of the linked display system 10. The CPU 207 of the information device 2 loads and executes the HMD linking application 211 onto the RAM 208, whereby a display control section 401, a content analysis section 402, and a communication control section 403 are developed. The CPU 355 of the HMD 3 loads and executes the HMD linking application 581 onto the RAM 356, whereby a display control section 501, a content analysis section 502, a communication control section 503, and a line-of-sight detection section 504 are developed. The functions of the respective sections will be described later with reference to a flowchart of FIG. 9 and that of FIG. 10.

Figure 8:
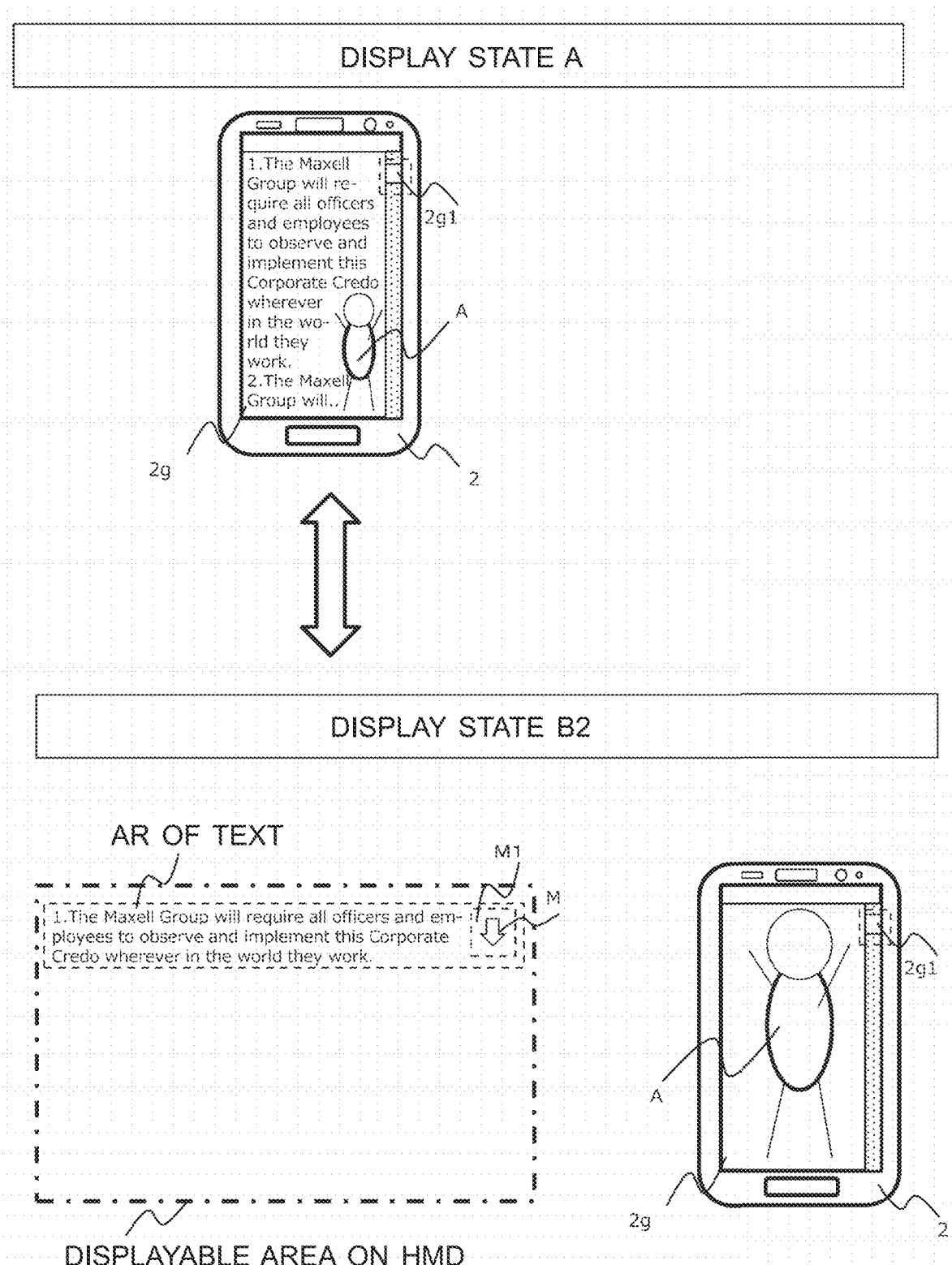
FIG. 8 illustrates another display switch example by the linked display system.

Each FIG. 7 and FIG. 8 illustrates a display switch example by the linked display system 10.

In a display state A (the all-content display state) of FIG. 7 and FIG. 8, when connection between the information device 2 and the HMD 3 is established and then the information device 2 transmits the text data to the HMD 3, transition of the display state A1 to a display state B1 (see FIG. 7) or a display state B2 (see FIG. 8) is made. When the information device 2 or the HMD 3 receives an instruction for terminating the linkage, transition from the display state B1 or the display state B2 to the display state A is made.

In the display state A, that is, in the display state where the content is displayed only by the information device, the content containing the text data and an image A is displayed on the information device 2. At the right end of the screen 2g of the touch screen display 204, a scroll bar 2g1 for moving the display screen in the front and rear directions is provided.

In the display state B1, only the image A is displayed on the information device 2 while only the text data is displayed on the HMD 3. The display size of the image A in the display state B1 is larger than the display size of the image A in the display state A. In this connection, although it is often the case to refer an object displayed on the HMD 3 as an "AR", a virtual object (corresponding to the text data in FIG. 7) displayed on the HMD 3 is not necessarily associated with a real object or a position.

In the display state B1, the text data is gathered and displayed on the left side of the display area (virtual screen) of the HMD 3 so as to ensure the visibility of the center of the visual field of the wearer (user 1) of the HMD 3.

As illustrated in the display state B2, the text data may be gathered and displayed near the top of the virtual screen of the HMD 3 so as to ensure the visibility of the center of the visual field of the wearer of the HMD 3. In particular, in the case where the wearer of the HMD 3 is working while looking down at his or her hand or a real object, such as for cooking, displaying a virtual object only on the upper part of the virtual screen of the HMD 3 can ensure the visibility during cooking. Depending on working states, the position on which the virtual object is to be displayed may be set to either the lower part or the left or right part. The display position may be arbitrarily determined by the wearer, or may be automatically set by the HMD 3. In the case where the HMD 3 automatically sets the position, the out-camera detects a moving range of the wearer's hand so that the virtual object can be displayed on a position of the display area of the HMD 3 where the virtual object does not overlap the detected moving range of the wearer's hand.

In each of the display states B1 and B2, in the case where the number of characters in the text data is so large that they cannot fit within the virtual screen, the display control section 501 displays a virtual object M having an arrow shape for scrolling the virtual screen together with the text data on the virtual screen of the HMD 3. An arrow selection area M1 is formed by a closed area including the virtual object M. The arrow selection area M1 is an area in which the display control section 501 determines that the line of sight has selected the arrow.

The line-of-sight detection section 504 is configured to cause the in-camera to capture an image of the face of the wearer of the HMD 3 so as to detect a line-of-sight direction based on the captured face image. Then, upon detecting that the line of sight of the wearer has reached the arrow selection area M1, the display control section 501 makes a displayable area of the HMD 3 move in the direction of the arrow. The HMD 3 notifies the information device 2 that the screen has been scrolled. When an image associated with newly displayed text data as a result of scroll is an image B which is different from the image A, the information device 2 switches the image A to the image B.

Figure 9:
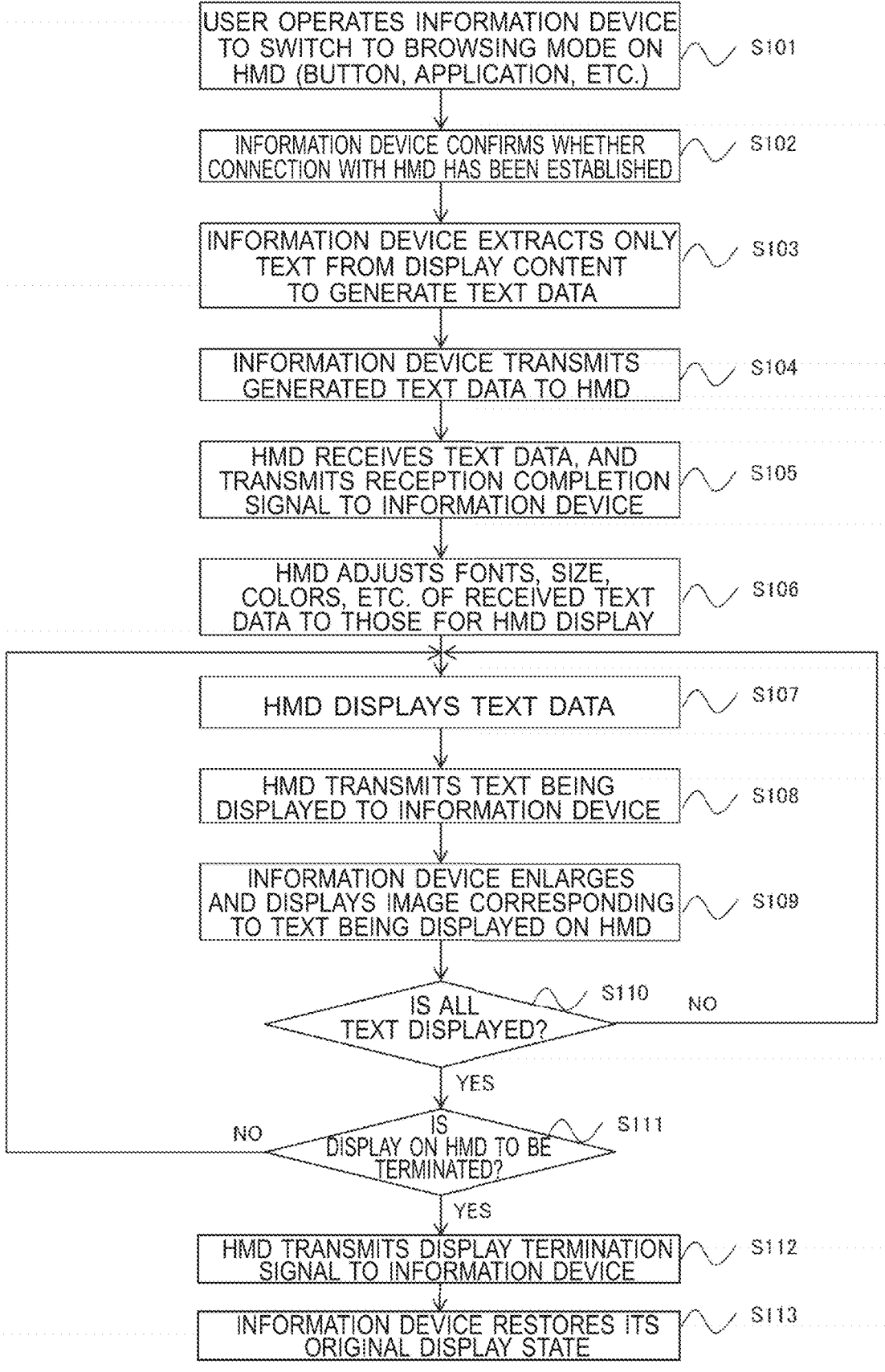
FIG. 9 illustrates a flowchart of processing of analyzing content on the information device side.

Each FIG. 9 and FIG. 10 explains a flow of processing of the linked display system. In step S100, an application is started. The following processing is started from a state in which a main power of the information device 2 and that of the HMD 3 are turned on, the HMD linking application is started in each of the information device 2 and the HMD 3, and pairing therebetween is completed.

FIG. 9 illustrates a flowchart of processing of analyzing the content on the side of the information device 2.

In a state where the text data and the image A are displayed (display state A) on the information device 2, a user operates the information device 2 to switch to a mode for browsing the content on the HMD 3 (step S101).

The communication control section 403 of the information device 2 confirms whether connection with the HMD has been established (step S102).

The content analysis section 402 of the information device 2 extracts only text from the displayed content to generate text data (step S103).

The content analysis section 402 outputs the generated text data to the communication control section 403. The communication control section 403 transmits the text data via the wireless communication unit 206 to the HMD 3 (step S104).

The communication control section 503 of the HMD 3 receives the text data via the wireless communication unit 354, and transmits a reception completion signal to the information device 2 (step S105).

The display control section 501 of the HMD 3 adjusts the received text data, for example, fonts, size, and colors thereof to those for HMD display (step S106), and causes the projection optical system 32 and the display optical system 33 to display the text data on the HMD 3 (step S107).

The display control section 501 causes the wireless communication unit 354 to transmit the text which has been displayed to the information device 2 (step S108).

The content analysis section 402 determines an image corresponding to the text which has been displayed on the HMD 3, and the display control section 401 causes the touch screen display 204 of the information device 2 to enlarge and display the image (step S109).

In the case where the entire text is not displayed (step S110/NO), the display control section 501 continues to display the text on the HMD 3 (step S107).

In the case where the entire text is displayed (step S110/YES) but display of the text on the HMD 3 is requested to continue (step S111/NO), the display control section 501 continues to display the text on the HMD 3 (step S107).

In the case where display of the text on the HMD 3 is requested to be terminated (step S111/YES), the HMD 3 transmits a display termination signal to the information device 2 (step S112).

Upon receiving the display termination signal, the display control section 401 of the information device 2 restores the original display state of the information device 2 (step S113).

FIG. 10 illustrates a flowchart of the processing of analyzing the content on the side of the HMD 3. The same steps as those in FIG. 9 are provided with the same reference signs, and a repetitive explanation therefor is omitted.

After confirming that connection with the HMD 3 is established (step S102), the information device 2 transmits the content data (text data and image data) to the HMD 3 (step S201).

The HMD 3 receives the content data, and causes the communication control section 503 to transmit the reception completion signal to the information device 2 (step S202).

The content analysis section 502 of the HMD 3 extracts the text part from the received content data to generate the text data (step S203), performs the processing for displaying the text data on the HMD 3 (step S106), and displays the text (step S107). Thereafter, in the same manner as the flow of FIG. 9, the information device 2 enlarges and displays the image.

In the steps described above, there may be various methods in which the content analysis section 502 of the HMD 3 and the content analysis section 402 of the information device 2 discriminate between text and images. For example, in the case of a website or e-book data in EPUB format, the content analysis section 502 and the content analysis section 402 may analyze the sources of HTML, XML, and XHTML to separate the text to be displayed from the image files, and extract the text being displayed (excluding a part of the text that is not being displayed on the information device 2, such as comments) to generate the text data.

On the other hand, since the image has the directory information of storage location in its tag, the content analysis section 502 and the content analysis section 402 may be configured to directly acquire the corresponding address therefrom so that the image can be displayed on the information device 2.

In the case of PDF data, the content analysis section 502 and the content analysis section 402 may extract a portion that can be written out by such as the OCR as the text data.

In addition, as a method of displaying only an image on the information device 2, for example, in the case where a user is using the information device 2 to browse a site, since the URL (storage location of the image file on the server) has been already read at the time of displaying the image, it may be only needed to display its address.

On the other hand, in the case where the content data does not include any image, the displayed content may be displayed as it is on the information device 2. This case is an exception of the above-described processing using the content including text and an image.

According to the first embodiment, at the time of displaying the content including text and an image by linking the information device 2 with the HMD 3, it is possible to display only the text data on the HMD 3 while enlarging and displaying the image on the information device 2. With this configuration, since the image is not displayed on the HMD 3, in the state where the user wears the HMD 3 and visually recognizes the text information displayed thereon, the visibility of the text information displayed on the HMD 3 can be improved. Furthermore, since the image is enlarged and displayed on the information device 2, the user who wants to watch the image is only required to look at the information device 2 to visually recognize the enlarged image as a real image, whereby the visibility of the image can be improved.

Second Embodiment

The difference between the second embodiment and the first embodiment can be found in content. In particular, the linked display system according to the second embodiment is configured to link and display content in which a part of text and an image are associated with other for each operation process (procedure), which is different from the linked display system according to the first embodiment.

Figure 11:
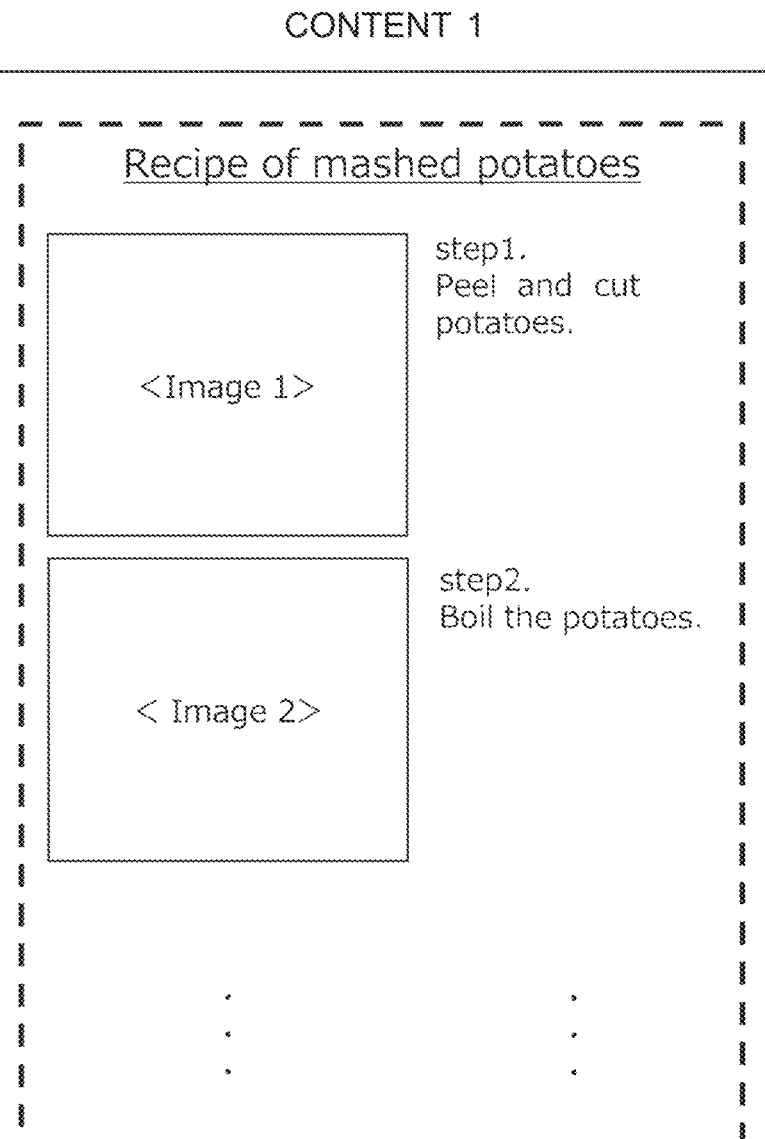
FIG. 11 illustrates an example of content used in the second embodiment.
Figure 12:
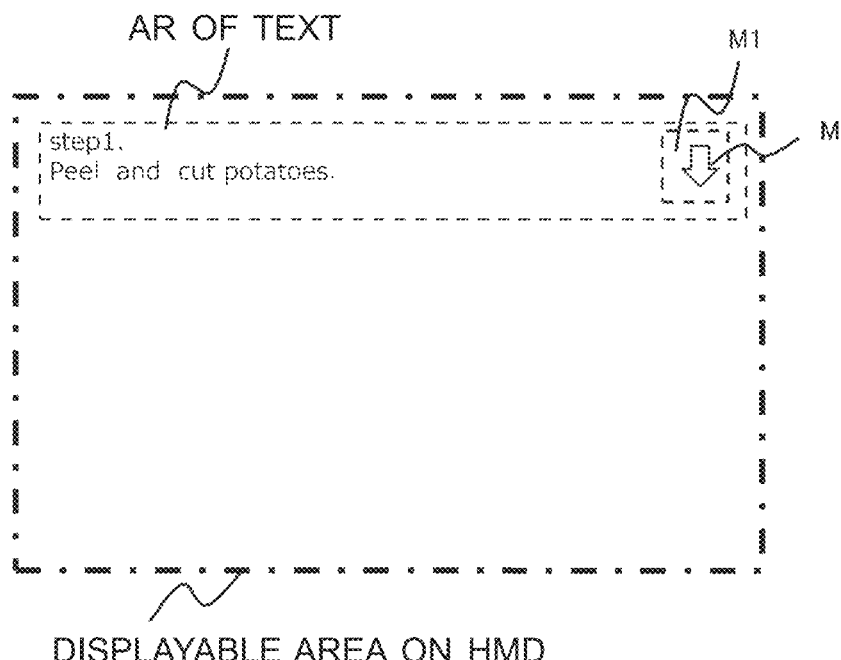
FIG. 12 illustrates a display example on the HMD according to the second embodiment.
Figure 14:
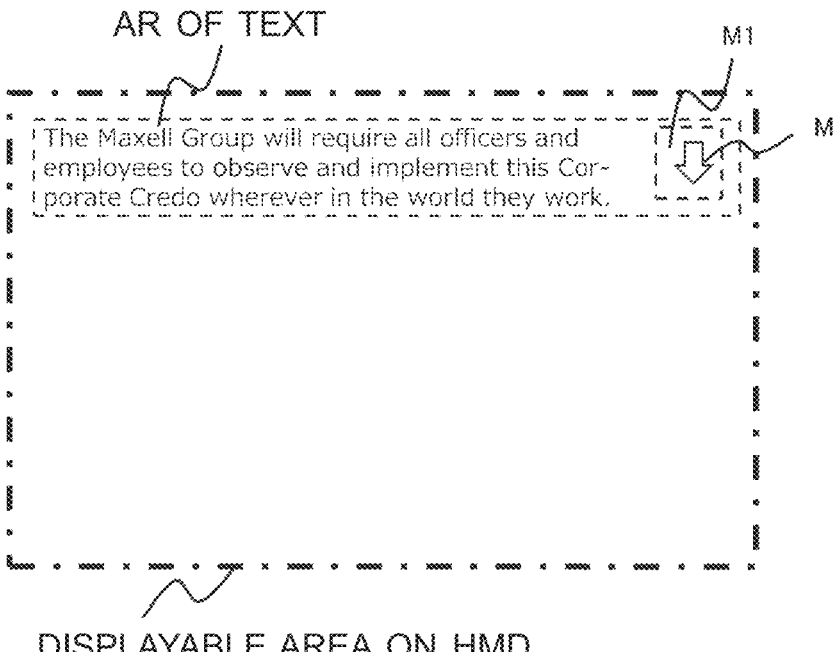
FIG. 14 illustrates a display example on the HMD according to the second embodiment.

FIG. 11 illustrates an example of content used in the second embodiment. FIG. 12 illustrates a display example on the HMD according to the second embodiment. FIG. 13 illustrates an example of content used in the first embodiment. FIG. 14 illustrates a display example on the HMD 3 according to the second embodiment.

The content 1 of FIG. 11 is content in which an image such as a figure or a picture is associated with a part of text in one-to-one relation. The content 1 includes content involving activities, for example, cooking recipes, guides for sewing and gardening, training manuals of stretching and workout, and methods for dressing kimonos and tying obi belts for kimonos. The image associated with the part of the text may contain a still image or video.

The image and the part of the text in the content are placed such that, in the case of the cooking recipes, an Image 1 showing a preliminary cooking procedure is displayed on the left side of the screen while the part of the text corresponding to the Image 1 describing the procedure is displayed on the right side of the Image 1. An Image 2 showing the next procedure is arranged on the lower side of the Image 1 while another part of the text corresponding to the Image 2 is arranged on the lower side of the text corresponding to the Image 1.

As a criterion in which the content analysis section 502 of the HMD 3 and the content analysis section 402 of the information device 2 recognize that the parts of the content are displayed along the processes, at least one of the following criteria or any combination thereof may be used, for example.

(Criteria 1) Each part of text and each image are placed on a frame or a table per paragraph.

(Criteria 2) A number or alphabet indicating the order is provided at the top of each text.

(Criteria 3) A number or alphabet indicating the order is provided on a caption of each image (in the case of a web site, an <ALT> tag may be used).

(Criteria 4) Each title sentence contains a word such as "procedure", "recipe", "how to", or "method", which means the activity procedure.

Upon determining that the content is divided for each process based on one of the criteria such as a frame, table, and paragraph, or any combination thereof, the content analysis section 502 of the HMD 3 and the content analysis section 402 of the information device 2 switch from the display state A to the display state B1 or the display state B2. In this case, as illustrated in FIG. 12, the content analysis section 502 of the HMD 3 extracts and displays only the text portion from the part of the content included in one process. The content analysis section 502 of the HMD 3 further displays the arrow selection area M1 on a position near the AR of the text. Upon detecting that the user's line of sight has stayed in the arrow selection area M1 for a predetermined time, the line-of-sight detection unit 504 may output a detection result to the content analysis section 502 so that the content analysis section 502 causes the display control section 501 to display the content of the next procedure (step). For example, the screen of the HMD 3 illustrated in FIG. 12 is updated and displays the text "step2. Boil the potatoes." of FIG. 11.

On the other hand, the content 2 of FIG. 13 is an example of content which is determined to be not divided for each process by the content analysis section 502 of the HMD 3 and the content analysis section 402 of the information device 2.

The content 2 is content in which an image such as a figure or a picture is not associated with a part of text in one-to-one relation, that is, content only to be "read", for example, news, columns, and blogs.

In the content 2, below a title sentence of an article or column, an image such as a figure or a picture (hereinafter, referred to as <Fig.>) and a part of the text are not placed in a one-to-one manner. This type of content, in which the <Fig.> is inserted in the middle of the text, is mainly provided to be "read" by a user. In this case, there is no regularity at the place where the <FIG.> is to be inserted while the author appropriately inserts the <FIG.> depending on the type of the content. The number of <FIG.> to be inserted may be one or more.

When not recognizing that the content shows a procedure (content divided for each process), the content analysis section 502 of the HMD 3 and the content analysis section 402 of the information device 2 determine that the content is provided to be read such as a news article, a column, or a blog.

In the case of a web site (news, blog, etc.), an image inserted in the content is displayed in accordance with a description position of an image insertion tag, or, displayed by reading a link destination such as a URL where the image is stored.

In the case of displaying a Word file or a PDF file, in the same manner as described above, when processes can be recognized, an image and a part of text may be displayed for each process. When the processes cannot be recognized, the image and the part of the text may be displayed separately in the same manner as the first embodiment so that the image is updated and displayed in accordance with scroll of the screen on which the text is being displayed. On the other hand, in the second embodiment, instead of processes, an image is used as an indicator for determination of a break in the content. For example, the content analysis section 502 determines a portion from the start to "The Maxell Group . . . (hereafter, referred to as "We")" as one block (being composed of partial data of content), and displays it on the HMD 3. At this time, in the case where one block does not fit within the display area of the HMD 3, as illustrated in FIG. 14, the content analysis section 502 displays the arrow selection area M1 on a position near the AR of the text. Upon detecting that the user's line of sight has stayed in the arrow selection area M1 for a predetermined time, the line-of-sight detection unit 504 may output a detection result to the content analysis section 502 so that the content analysis section 502 causes the display control section 501 to display the content in the next block.

Linking and displaying content that is not related to processes as illustrated in FIG. 13 benefits a user who wants to watch the content that can be easily read such as news and columns while doing daily work such as brushing teeth and folding laundry or doing tasks without requiring thoughts. In such a situation, the user cannot hold the information device 2 since he or she has to move his or her hand for the work, or when doing the work while putting on the information device 2 nearby and watching the screen, he or she often needs to stop the work. On the other hand, displaying a text portion (main part of the content) on the HMD 3 allows the user to read the content without stopping the work.

The second embodiment for displaying content for each process also benefits, for example in the case of cooking, the user who wants to watch a recipe during cooking. Since the text portion of a recipe is displayed on the HMD 3, the user wearing the HMD 3 can check the recipe in any place while keeping his or her hand clean even in a situation where there is no space to put a recipe book under an opened state, the user feels trouble about frequently going to check the recipe book, the user feels that tapping and scrolling a display by a finger is insanitary at the time of watching the recipe on a smartphone or a tablet, or the user cannot watch the recipe on the information device 2 as a screen is locked (display is hidden) after a certain time has elapsed even when he or she wants to check the recipe immediately.

In addition, the user can check a finished state by displaying (enlarging) an image with full screen on the information device 2.

Furthermore, the present invention solves a problem that, although the user wants to read the descriptive text while enlarging and displaying the image, it is difficult to check them at the same time on the information device 2 alone.

Still further, as a method of updating and displaying the next procedure (process) or content, or content of the next block, the arrow selection area M1 is displayed to make the user's line of sight stay therein for a predetermined time, whereby making it possible to update and display the content even in a situation where both hands are occupied, for example, during doing tasks.

Each of the above-described embodiments does not limit the present invention, and a part of the configuration of one of the embodiments can be replaced with the other one of the embodiments. In addition, a configuration of one of the embodiments can be added to the other one of the embodiments. These modifications are included in the scope of the present invention. Furthermore, numerical values and messages appearing in the text and drawings are merely examples, and thus the advantageous effects of the present invention are not impaired even if different ones are used.

A part or all of the functions of the present invention may be implemented in hardware, for example, by designing them in an integrated circuit, or may be implemented in software by causing such as the microprocessor unit or the CPU to interpret and execute the operation program. In addition, the hardware and the software may be used in combination without limiting the scope of software implementation.

For example, the image (still image or video) may be displayed on the information device 2 on which the user watched it firstly, or displayed on other display devices, which are different from the information device 2, such as a television and a monitor, by transmitting the content thereto.

Still further, the present invention may be configured to capture a front view including the visual field of the wearer by using the camera of the HMD 3 to generate front image data, analyze a state of a subject in the front image data by using the content analysis section 502, notify the display control section 501 when determining that the state of the subject is included in the next process, and update the text data being displayed on the virtual screen to display the text data associated with the next process by using the display control section 501.

REFERENCE SIGNS LIST

1: user
2*a*: communication signal
2*g*: screen
2*g*1 scroll bar
3: HMD
3*a*, 4*a*: communication signal
4: access point
5: network
6: web server
10: linked display system
30: camera
31: ranging device
32, 32*a*, 32*b*: projection optical system
33: display optical system
34: nose pad
35: processor
36: speaker
37: microphone
38*a*, 38*b*, 38*c*: frame housing
203: graphics processing unit
204: touch screen display
206, 354: wireless communication unit
207, 355: CPU
208, 356: RAM
210, 580: basic operation program
211, 358: HMD linking application
351: distance calculation unit
357: image RAM
401, 501: display control section

402, 502: content analysis section

403, 503: communication control section

504: line-of-sight detection section

581: program

M: virtual object

M1: arrow selection area

The invention claimed is:

1. A head mount display comprising:

a display;

a communication interface configured to communicate with an information device; and a processing circuit, wherein the processing circuit is configured to:

receive content data from the information device via the communication interface, determine whether the content data is process data in which text data and image data are associated in one-to-one relation for each of a plurality of processes, in response to determining that the content data is the process data, extract data corresponding to one of the plurality of processes from the text data included in the content data, and control the display to display the extracted text data within a predetermined area of a virtual screen, and in response to determining that the content data is not the process data, using the image data included in the content data as a break indicator of the content data, extract partial data from the text data included in the content data to the break indicator as one block, and control the display to display the extracted partial text data within the predetermined area of the virtual screen.

2. The head mount display according to claim 1, wherein the predetermined area of the virtual screen is an area placed outside a center area of a visual field of a wearer of the head mount display.

3. The head mount display according to claim 1, further comprising:

a camera for capturing an image of a front view including a visual field of a wearer of the head mount display to generate a front image, wherein in response to determining that a state of a subject in the front image generated by the camera is included in a next process of the one of the plurality of processes when displaying the extracted text data within the predetermined area after determining that the content data is the process data, the processing circuit extracts another text data corresponding to the next process from the text data included in the content data, and displays the extracted another text data within the predetermined area.

4. The head mount display according to claim 3, wherein the process data is data corresponding to procedures of cooking, sewing, gardening or training.

5. The head mount display according to claim 3, wherein the predetermined area of the virtual screen is an area placed outside a center area of a visual field of the wearer.

6. The head mount display according to claim 3, wherein in response to displaying the extracted another text data, the processing circuit is configured to transmit a notification to the information device via the communication interface.

7. The head mount display according to claim 1, further comprising:

a line-of-sight detection sensor configured to detect a line-of-sight of a wearer of the head mount display, wherein the processing circuit is configured to:

in response to determining that the content data is the process data, display a selection object with the extracted text data, in response to determining that the line-of-sight of the wearer detected by the line-of-sight detection sensor has stayed for a predetermined time on the selection object, extracts another text data corresponding to a next process of the one of the plurality of processes from the text data included in the content data, and displays the extracted another text data within the predetermined area.

8. The head mount display according to claim 7, wherein the predetermined area of the virtual screen is an area placed outside a center area of a visual field of the wearer.

9. The head mount display according to claim 7, wherein the selection object has an arrow shape.

10. The head mount display according to claim 7, wherein in response to displaying the extracted another text data, the processing circuit is configured to transmit a notification to the information device via the communication interface.

11. The head mount display according to claim 1, wherein in response to determining that the number of characters in the extracted partial text data does not fit within the predetermined area of the virtual screen, the processing circuit is configured to control the display to display a virtual object for displaying a part of the extracted partial text data which has not been displayed.

12. The head mount display according to claim 11, wherein the virtual object is an object for scrolling the extracted partial text data.

13. The head mount display according to claim 12, wherein in response to that the virtual object has selected, the processing circuit is configured to scroll the extracted partial text data and transmit a notification to the information device via the communication interface.

14. The head mount display according to claim 12, wherein the virtual object has an arrow shape.

15. The head mount display according to claim 11, further comprising:

a line-of-sight detection sensor configured to detect a line-of-sight of a wearer of the head mount display, wherein in response to determining that the line-of-sight of the wearer detected by the line-of-sight detection sensor has stayed for a predetermined time on a virtual reality object, the processing circuit is configured to display the part of the extracted partial text data which has not been displayed.

16. The head mount display according to claim 1, wherein in response to analyzing that the text data and the image data included in the content data are placed per paragraph, the processing circuit is configured to determine that the content data is the process data.

17. The head mount display according to claim 1, wherein in response to analyzing that a number or an alphabet indicating an order is provided at a top of the text data included in the content data, the processing circuit is configured to determine that the content data is the process data.

18. The head mount display according to claim 1, wherein in response to analyzing that a number or an alphabet indicating an order is provided on a caption or a tag of the image data included in the content data, the processing circuit is configured to determine that the content data is the process data.

19. The head mount display according to claim 1, wherein in response to analyzing that the text data included in the content data includes a word indicating an activity procedure, the processing circuit is configured to determine that the content data is the process data.

\* \* \* \* \*